United States Patent

Buske

[11] 3,729,926
[45] May 1, 1973

[54] CLAW HOOK FOR CHAINS
[76] Inventor: Ervin Buske, P.O. Box 190, Gowrie, Iowa 50543
[22] Filed: May 25, 1971
[21] Appl. No.: 146,643

[52] U.S. Cl. .................................................. 59/93
[51] Int. Cl. ............................................ F16g 15/00
[58] Field of Search ................... 59/93, 78, 86, 90; 294/82 R

[56] References Cited

UNITED STATES PATENTS

| | | | |
|---|---|---|---|
| 2,878,640 | 3/1959 | Johnson | 59/93 |
| 2,900,864 | 8/1959 | Chapman | 59/93 |
| 705,035 | 7/1902 | Cass | 59/93 |
| 2,165,377 | 7/1939 | Henry | 59/93 |
| 2,433,567 | 12/1947 | Lofgren | 152/233 |
| 3,233,933 | 2/1966 | Coski | 294/82 R |
| 3,282,045 | 11/1966 | Thelan | 59/93 |
| 3,333,412 | 8/1967 | Rieger | 59/93 |
| 3,521,443 | 7/1970 | Dragonuk | 59/93 |
| 3,601,978 | 8/1971 | Rieger | 59/93 |

Primary Examiner—Charles W. Lanham
Assistant Examiner—Gene P. Crosby
Attorney—James H. Littlepage

[57] ABSTRACT

Two claws spaced to provide a slot therebetween extend from a flat body having an enlarged aperture with a slot extending from one side. Chain links can be engaged in either the claw slot or the body slot. An attachment fitting in the body slot has a post engagable into an aperture in a device to which the attachment may be anchored.

1 Claim, 5 Drawing Figures

Patented May 1, 1973  3,729,926

INVENTOR
ERWIN BUSKE

BY James H. Littlepage
ATTORNEY

CLAW HOOK FOR CHAINS

The object of this invention is to provide a claw hook for chains, which can be attached to a chain and to work to be pulled by a chain in various ways to serve several functions. While this device has general utility, it was devised for use in automobile body repair shops. The claw hook, having a pair of spaced claws with a slot therebetween, can be hooked onto a damaged part of an auto body, and tension may be applied by a portable aliner by hooking a pull chain into a slot radiating from an enlarged aperture in the body from which the claws extend. Another function is to hook two chains together, one with a link in the claw slot and one with a link in the body slot, and still another function is to take up slack in a chain. Longitudinally spaced links on a chain can be engaged in the body and claw slots, with any desired amount of slack left hanging between. Various combinations of chains and claw hooks may likewise be used, for example, oppositely reaching claw hooks may be engaged over lower and upper sides of a bumper.

These and other objects and uses will suggest themselves to those skilled in the art in the light of the following specification and drawings, in which.

Figure 5:
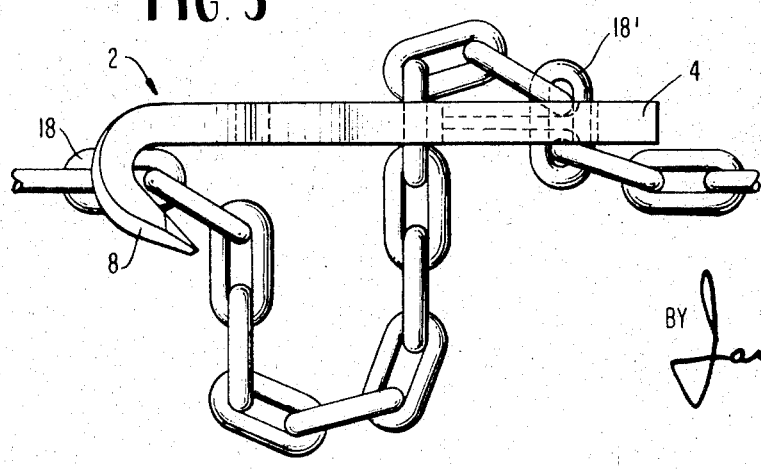

FIG. 5 shows the claw hook in use for taking up slack in a chain. Referring now to the drawings, in which like reference numerals denote similar elements, the claw hook 2 consists of a generally flat body 4 having hooked claws 6 and 8 extending from one end. The claws are spaced from one another to provide a slot 10 therebetween. Through a centrally enlarged part of the body extends an enlarged aperture 12 having a slot 14 radiating from one side. Preferably, the edges of the slot are beveled, as indicated at 16. Both slots 10 and 14 extend in the same direction, and both are large enough to receive one chain link 18 or 18'' while being narrow enough to block passage therethrough of adjacent chain links, as shown in FIG. 5.

Figure 1:
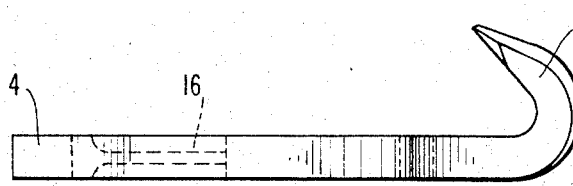
FIG. 1 is a side elevation of the claw hook.
Figure 2:
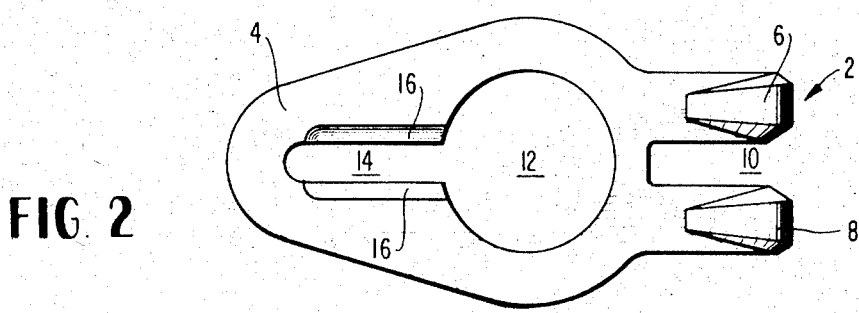
FIG. 2 is a plan view of the claw hook.
Figure 3:
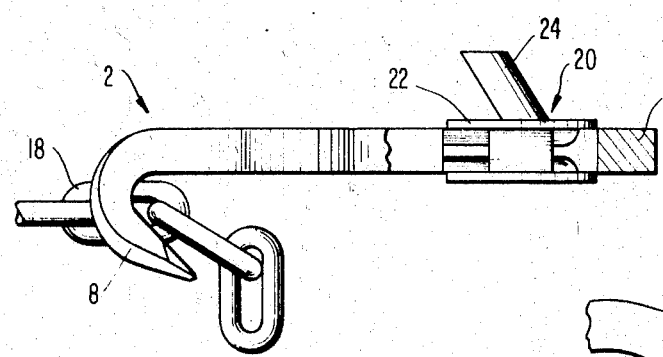
FIG. 3 is a side elevation, broken away, showing a chain engaged in the slot between the claws, and showing a post attachment for the body slot.
Figure 4:
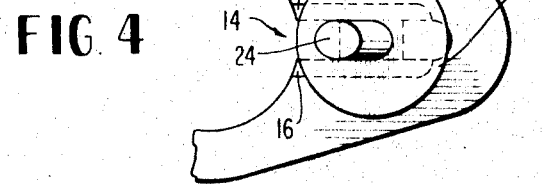
FIG. 4 is a fragmentary plan view of the post attachment shown in FIG. 3.

The body slot 14 may alternatively be used to receive a bolt (not shown) by means of which the claw hook may be attached to something, or it may be used to receive an attachment 20 (FIGS. 3 and 4) in the form of a spool 22 having a post 24 thereon for engaging in an aperture in a device to which the claw hook is to be anchored. The attachment includes a pair of washer-like plates 26 which are of less diameter than the enlarged aperture 12, but amply large to bridge over slot 14, and a connecting shank 28 which slidably engages in slot 14. As shown in FIG. 4, the claw hook may be used for taking up slack in a chain, or for coupling two chains together.

I claim:

1. A claw hook comprising a generally flat body having a pair of spaced hooked claws curled upwardly and outwardly from and thence backwardly over one end of said body, said claws being spaced from one another to provide therebetween a slot which has a closed end portion extending into said body towards the other end thereof at the base of said claws and which is adapted to receive therein a chain link whose width is arranged in the direction of the slot, said body also having therethrough a generally circular aperture larger in diameter than the width of the slot between the claws and a slot extending from one side of said aperture, the slot in said body being of about the same width across as the slot between the claws and adapted to receive therein a chain link whose width is arranged in the direction of the slot, and having a closed end portion disposed in the same direction as the closed end portion of said slot between the claws, and opposed beveled edges for accommodating ends of links adjacent to the link received in the slot.

* * * * *